US007623256B2

(12) United States Patent
Ciriza et al.

(10) Patent No.: US 7,623,256 B2
(45) Date of Patent: Nov. 24, 2009

(54) AUTOMATED JOB REDIRECTION AND ORGANIZATION MANAGEMENT

(75) Inventors: Victor Ciriza, La Tour du Pin (FR); Francois Ragnet, Venon (FR)

(73) Assignee: Xerox Corporation, Norwalk, CT (US)

( * ) Notice: Subject to any disclaimer, the term of this patent is extended or adjusted under 35 U.S.C. 154(b) by 1098 days.

(21) Appl. No.: 11/013,322

(22) Filed: Dec. 17, 2004

(65) Prior Publication Data
US 2006/0132826 A1 Jun. 22, 2006

(51) Int. Cl.
*G06F 3/12* (2006.01)
*G06F 15/173* (2006.01)
*G06F 11/30* (2006.01)
*H04N 1/32* (2006.01)

(52) U.S. Cl. ........................ 358/1.15; 358/1.1; 358/406; 709/238

(58) Field of Classification Search .......... 709/238–244
See application file for complete search history.

(56) References Cited

U.S. PATENT DOCUMENTS

| 2002/0156917 | A1 | 10/2002 | Nye |
| 2002/0196463 | A1 | 12/2002 | Schlonski et al. |
| 2003/0090697 | A1 | 5/2003 | Lester et al. |
| 2003/0093521 | A1 | 5/2003 | Schlonski et al. |
| 2004/0190042 | A1* | 9/2004 | Ferlitsch et al. ............ 358/1.15 |
| 2006/0206445 | A1* | 9/2006 | Andreoli et al. ................ 706/52 |
| 2007/0268509 | A1* | 11/2007 | Andreoli et al. ............ 358/1.14 |
| 2008/0300879 | A1* | 12/2008 | Bouchard et al. ........... 704/256 |

FOREIGN PATENT DOCUMENTS

| EP | 0996055 A2 | 12/1995 |
| EP | 0917044 A2 | 5/1999 |
| EP | 0996055 A2 | 4/2000 |
| EP | 0917044 A3 | 5/2000 |
| EP | 0996055 A3 | 5/2004 |

OTHER PUBLICATIONS

Battista, G. et al. "Algorithms for Drawing Graphs: An Annotated Bibliography", Computational Geometry: Theory and Applications, vol. 4, No. 5, pp. 235-282, 1994.

CUPS Software Administrators Manual, Chapter 4, "Printer Classes", available on the Internet at www.cups.org/PRINTER_CLASSES, CUPS-SAM-1.1.21, Easy Software Products, 2003.

(Continued)

*Primary Examiner*—Twyler L Haskins
*Assistant Examiner*—Myles D Robinson
(74) *Attorney, Agent, or Firm*—Oliff & Berridge, PLC

(57) ABSTRACT

Job logs are mined in order to compute a redirection matrix for managing operation of a plurality of systems. The redirection matrix may be used to identify alternative systems in the event a user selected system becomes unavailable to which a job may be redirected. In addition, the redirection matrix may be used to compute a network printer topology and print clusters for use with network management and system analysis.

19 Claims, 10 Drawing Sheets

OTHER PUBLICATIONS

Eades, P. in "A Heuristic for Graph Drawing", *Congressus numerantium*, vol. 42, pp. 149-160, 1984.

Microsoft Knowledge Base Article, No. 318749, "How to: Create a Printing Pool in Windows 2000", available on the Internet at www.support.microsoft.com, Sep. 2003.

Newman, M. E. J. "Fast Algorithm for Detecting Community Structure in Networks", Phys. Rev. E 69, 066133, 2004.

"Printing Protocol", Xerox System Integration Standard, XNSS 118404, Apr. 1984.

Product Brochure, "HP Output Server, Reliable Document Delivery Across the Enterprise", available on the Internet at http://www.hp.com/united-states/outputmanagement/products/hpom_output_srvr.pdf, Apr. 2004.

Product brochure, "JetCAPS® ClusterQue, Balanced and Controlled Volume Printing", available on the internet at http://h40041.www4.hp.com/contents/solutions/pdf/ds_clusterque.pdf, Jul. 2004.

U.S. Appl. No. 11/013,323, "Multifunction Device with Secure Job Release", filed Dec. 17, 2004.

"Xerox Network Systems Architecture", General Information Manual, XNSG 068504, Apr. 1985.

Andreoli, Jean-Marc et al., "Probabilistic Latent Clustering of Device Usage", Advances in Intelligent Data Analysis, 6$^{th}$ International Symposium on Intelligent Data Analysis, vol. 3646, Sep. 8-10, 2005, pp. 1-11.

European Search Report for EPO Counterpart Application No. EP 05 25 7523, Jul. 25, 2006.

\* cited by examiner

PRINTER COMMUNITY A

| USER ID | # of PRINT JOBS |
|---|---|
| USER 001 | 23 |
| USER 003 | 50 |
| USER 006 | 56 |
| USER 008 | 63 |
| USER 011 | 23 |
| ⋮ | ⋮ |

302

PRINTER COMMUNITY B

| USER ID | # of PRINT JOBS |
|---|---|
| USER 001 | 2 |
| USER 005 | 60 |
| USER 006 | 22 |
| USER 008 | 33 |
| USER 012 | 34 |
| ⋮ | ⋮ |

OVERLAPPING COMMUNITY $C_{AB}$

| USER ID | # of PRINT JOBS |
|---|---|
| USER 001 | 23 |
| USER 006 | 56 |
| USER 008 | 63 |
| ⋮ | ⋮ |
| TOTAL | 538 |

OVERLAPPING COMMUNITY $C_{BA}$

| USER ID | # of PRINT JOBS |
|---|---|
| USER 001 | 2 |
| USER 006 | 22 |
| USER 008 | 33 |
| ⋮ | ⋮ |
| TOTAL | 233 |

*FIG. 4*

REDIRECTION MATRIX

|     | →A  | →B  | ·   | ·   | ·   |
|-----|-----|-----|-----|-----|-----|
| A→  | ▨   | 538 |     |     |     |
| B→  | 233 | ▨   |     |     |     |
| ·   |     |     | ▨   |     |     |
| ·   |     |     |     | ▨   |     |
| ·   |     |     |     |     | ▨   |

*FIG. 5*

FILTERED AND NORMALIZED REDIRECTION MATRIX

|     | →A  | →B  | ·   | ·   | ·   |
|-----|-----|-----|-----|-----|-----|
| A→  | ▨   | 0.6 |     |     |     |
| B→  | 0.2 | ▨   |     |     |     |
| ·   |     |     | ▨   |     |     |
| ·   |     |     |     | ▨   |     |
| ·   |     |     |     |     | ▨   |

*FIG. 6*

PRINTER A REDIRECTION VECTOR

| REDIRECT FROM PRINTER A TO PRINTER: | REDIRECTION WEIGHT: |
|---|---|
| A→B | 0.6 |
| A→C | 0.2 |
| ... | ... |

*FIG. 7*

| PRINTER | TYPE | JOBS PRINTED | LOCATION ||
|---|---|---|---|---|
| | | | BUILDING | FLOOR |
| BIBA | B&W | 1144 | QUARTZ | Ground |
| CANARD | B&W | 46 | CHATEAU | First |
| DAUPHINE | B&W | 6 | CHATEAU | Third |
| FIGARO | Color | 53 | CHATEAU | First |
| GEO | B&W | 920 | CHATEAU | Second |
| HERALD | B&W | 1198 | COURCARREE | First |
| HODAKA | B&W | 949 | CHATEAU | Second |
| HOLA | B&W | 1554 | QUARTZ | First |
| LEMONDE | B&W | 679 | QUARTZ | Ground |
| LEQUIPE | B&W | 88 | CHATEAU | Third |
| LIBE | Color | 1153 | QUARTZ | First |
| MESSAGER | B&W | 780 | CHATEAU | First |
| MIDILIBRE | B&W | 303 | CHATEAU | First |
| PHOSPHORE | B&W | 92 | CHATEAU | Ground |
| PREMIERE | B&W | 2146 | QUARTZ | First |
| REPORTAGE | Color | 533 | QUARTZ | Ground |
| SMART_STAMPA | B&W | 1 | COURCARREE | Ground |
| STAMPA | B&W | 1082 | COURCARREE | Ground |
| STUDIO | B&W | 1769 | QUARTZ | Second |
| TELERAMA | Color | 390 | COURCARREE | First |
| TIMES | B&W | 2389 | CHATEAU | Second |
| VERTICAL | Color | 723 | CHATEAU | Second |
| VOGUE | B&W | 2235 | QUARTZ | Ground |

*FIG. 8*

AUTOMATED JOB REDIRECTION AND ORGANIZATION MANAGEMENT

BACKGROUND AND SUMMARY

The following relates generally to methods for managing the operational efficiency of systems, such printer, scanners, and faxes that are networked together within an organization.

Network systems, such as printers, tend to be redundant services at different physical locations within a network community that may have some or no functional variability (e.g., color versus black and white). Generally when one system becomes unavailable, another system may be available to provide identical or substantially similar services located near the unavailable system. To exploit this redundancy, some printing systems are adapted to redirect print jobs when a printer is or becomes unavailable. For example, Windows 2000-based print servers and the Common UNIX Printing System™ ("CUPS™") provide for the creation of printer pools or printer classes, respectively. Jobs sent to a pool (through a logical printer) or a class are sent to the first available printer in the class.

Other publications such as for example, EP 0996055 A2, EP 0917044 A2, and US 2003/0090697 A1, disclose different systems for redirecting print jobs in the event a printer becomes unavailable. These and other known systems generally do not consider individual user preferences, but instead rely on preset values to specify printer redirection. It would therefore be advantageous to provide a system that is adapted to automatically determine a preferred printer or set of printers to redirect a print job when the desired (or originally selected) printer is or becomes unavailable. It would be further advantageous if such a system were adapted to identify printer candidates to which a print job may be forwarded in the event a desired printer is or becomes unavailable without requiring any preexisting knowledge of the network infrastructure or arrangement of devices thereon.

In accordance with the various embodiments described herein, there is provided a method, system and article of manufacture, for managing a plurality of communicatively coupled systems forming part of an organization (or network neighborhood). The method includes the acts of: collecting job log data; determining a user community for each of the plurality of system using the job log data; calculating overlapping communities for pairs of the plurality of systems; defining a redirection matrix using the overlapping communities for managing operation of the plurality of system of the organization.

In accordance with other of the various embodiments described herein, there is provided a method, system and article of manufacture, for managing a plurality of communicatively coupled systems forming part of an organization. The method includes the acts of: collecting job redirection information; defining a redirection matrix using the job redirection information; and computing one or both of a network topology and clusters using the redirection matrix.

The advantages of the embodiments described herein provide that: (a) asymmetrical relationships between systems may be described using the redirection matrix; (b) the redirection matrix may be used as input for any number of system management visualization engines that may, for example, graphically represent the data to monitor interrelationships between elements of an organization's infrastructure; (c) the redirection matrix may be used to discover a customer's infrastructure, redundancies, and capacity; (d) redirection decisions are based on users habits and therefore tend to follow natural or expected and/or preferred user behavior; and (e) the redirection matrix can be used to determine clusters which may be in turn used to evaluate inter-cluster flows (i.e., inter-cluster dependencies).

BRIEF DESCRIPTION OF THE DRAWINGS

These and other aspects of the disclosure will become apparent from the following description read in conjunction with the accompanying drawings wherein the same reference numerals have been applied to like parts and in which:

FIG. 3 illustrates example printer communities for two printers A and B;

FIG. 4 illustrates example overlapping communities $C_{AB}$ and $C_{BA}$ of printers A and B;

FIG. 5 illustrates an example redirection matrix for an organization;

FIG. 6 illustrates an example of a filtered and normalized redirection matrix;

FIG. 7 illustrates an example printer redirection vector for printer A selected from the first row of the redirection matrix shown in FIG. 6;

FIG. 8 illustrates an example table of printers available in a community composed of three physical locations;

DETAILED DESCRIPTION

A. System Overview

Figure 1:
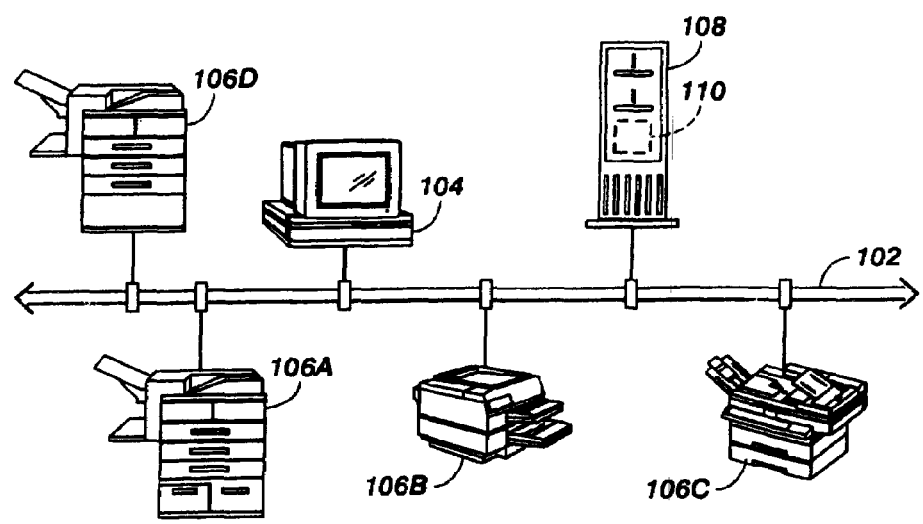
FIG. 1 is a simplified diagram showing the context of the embodiments described herein.

FIG. 1 is a simplified diagram showing the context of the embodiments described herein. In FIG. 1, there is provided a network 102 with an organization of a type familiar in the art. Existing on this network 102 is at least one computer 104 and, for purposes of the embodiments, a plurality of printers, such as here labeled 106A, 106B, 106C, and 106D. There is further provided on network 102 what is known as a print server 108, which acts as a virtual device to which all or some print requests on a network can be spooled before being sent to the physical device. In the embodiment shown in FIG. 1, the print server operates using an automated print job redirection system 110, which computes a redirection matrix and applies its values to automatically redirect print jobs in the event any of the printers 106 are or become unavailable, as more fully described herein.

In other embodiments described herein, the computer 104 and/or printers 106 and/or print server 108 have operating within one or more of them, in a centralized or decentralized manner, an automated print redirection and/or organization management system as described herein. Also, the word "printer" can for present purposes mean not only a printer, but any kind of device having printer-like features and/or functions and/or operational qualities (e.g., that operates as a shared resource on the network 102), such as a multifunction device (which includes one or more functions such as scanning, printing, and faxing), or a standalone device such as digital copier, input scanner, facsimile.

In yet other embodiments, the computer 104 in FIG. 1 may be the computer of a systems administrator responsible for the activities of some or all of the printers on network 102. Such responsibilities may, for example, include making sure that a certain number of printers are available and operating on the network 102, making sure the printers 106 on network 102 are of particular types, and making sure that the installed printers are appropriately selected for the needs of the organization. In a real-world context, particularly when there are dozens or even hundreds of printers on a network, it is inevitable that printers from time to time become unavailable because of required maintenance or repair or because of a large number of jobs are waiting to be completed in a job queue.

Thus, printers on the network may become temporarily unavailable for various reasons. In accordance with the embodiments disclosed herein, a system administrator may evaluate the printers available on the network of an organization and determine: (a) what would be the best printer to redirect a print job to when another printer becomes temporarily unavailable on the network; and (b) how to define a network topology for evaluating print use on the network. In addition, once printers are allocated on a network, the system administrator may inspect and manage the operation of the overall topology of the printer network to make sure the loads are balanced and they are effectively used. As will be described below, the management of the redirection of print jobs may be managed on the printer 106 or from the print server 108, or both.

B. Printer Redirection Model

Presented in this section is a general printer redirection model for carrying out the various embodiments described herein. In the model, n printers (such as printers 106 shown in FIG. 1) are coupled using a computer network (such as network 102 shown in FIG. 1) through which they are able to exchange data. Each of the n printers are represented in a network printer vector P defined as $P=\{p_1, p_2, \ldots, p_n\}$. Given the unavailability of a printer $p_i$ the maximum number of possible redirection candidates of a print job directed to printer $p_i$ is n−1. Therefore, resolving the problem of redirecting a print job from an unavailable printer to an available printer on a network equipped with n printers means evaluating for each printer n−1 redirection candidate printers As part of the redirection model, an n×n redirection matrix R is defined, where each element $r_{ij}$ in the redirection matrix R is a suitability measure of redirecting a print job from printer $p_i$ to printer $p_j$, which is referred to herein as "redirectibility". In accordance with one embodiment, the redirection matrix is developed such that its elements $r_{ij}$ satisfies:

$$\forall i, j \; r_{ij} \geq 0, \; \forall i \sum_{j=1}^{j=n} r_{ij} = 1,$$

which provides that the sum of all redirectibility elements for a row of the redirectibility matrix R sum to one. In accordance with this embodiment, the redirection process is modeled as a static markovian stochastic process in which each redirectibility element $r_{ij}$ in the redirectibility matrix R specifies the probability that a print job may be redirected from printer $p_i$ to printer $p_j$ when printer $p_i$ is unavailable and provided that printer $p_j$ is available.

One property of the redirection matrix R is that its elements along the diagonal equal zero (i.e., $\forall i \; r_{ii}=0$). This means that the redirectibility of any printer $p_i$ to itself is zero since self-redirection can be interpreted as a non-redirected printing action, and each row i in matrix R symbolizes the redirection vector $T_i$ for a printer $p_i$ that is defined as $T_i=\{r_{i1}, r_{i2}, \ldots, r_{in}\}$, and $r_{ii}=0$, where i indexes over each column and n indexes over each row in the redirection matrix R.

Further as part of the model, each printer $p_i$ is employed by a number $m_i$ of users. The number of users m is likely to differ between printers p since each printer may satisfy different needs of each user. For example, a printer may be more accessible because it is located proximate to the user while another printer may offer one or more functionalities that satisfy particular printing requirements (e.g., color printing). Accordingly as part of the model, a user community $U_i$ is defined for each printer $p_i$ such that user community $U_i=\{u_{i1}, u_{i2}, \ldots, u_{ik}, \ldots, u_{im_i}\}$, where $1<k<m_i$, and each element user u of the user community $U_i$ identifies a different user u that employs the printer $p_i$.

While a printer's user community $U_i$ may be generally well defined, a user $u_{ik}$ of the printer $p_i$ may occasionally print to another printer $p_j$ as a result of printer $p_i$ being unavailable or simply because printer $p_j$ provides functionalities (e.g., duplex or color printing) that satisfy exceptional print jobs. Therefore, a user $u_{ik}$ of the printer $p_i$ may appear in the user community $U_j$ community as user $u_{jk}$ (i.e., external to the user community).

In addition as part of the model, a community overlapping vector $C_{ij}$ is defined between user community $U_i$ of printer $p_i$ and user community $U_j$ of printer $p_j$ as follows:

$$C_{ij}=U_i \cap U_j,$$

where the dimensions of the community overlapping vector $C_{ij}$ depend on the number of overlapping users that print to printer $p_i$ and printer $p_j$ which is expected to be less than total number of users $m_i$ and $m_j$ that print to printer $p_i$ and printer $p_j$, respectively, $$C_{ij}=\{c_1, c_2, \ldots, c_d\}, d \leq m_i \hat{\;} d \leq m_j,$$

and as result of the overlapping or intersecting elements in $C_{ij}$ it reduces to:

$$C_{ij}=\{c_1, c_2, \ldots, c_s, \ldots, c_d\}, \text{ where } \forall c_s \in U_i, \forall c_s \in U_j.$$

C. Printer Redirection Matrix

This section generally outlines a method for computing a printer redirection matrix R followed by a discussion of certain aspects of the method. As defined above, each user $u_{ik}$ in the community overlapping vector $C_{ij}$ directs a certain number of print jobs to printer $p_i$, which in the event printer $p_i$ should become unavailable, could have been redirected to printer $p_j$. This potential of redirecting a job from a first printer $p_i$ to a second printer $p_j$ should the first printer $p_i$ become unavailable is recorded in a printer redirection matrix R, which is computed by considering those common users in different user communities U.

The general method for computing a printer redirection matrix R may be summarized in three general operations. First, all jobs that each overlapping community could have redirected are identified for each printer redirection combination (e.g., from printer $p_i$ to printer $p_j$). For example, this first operation involves identifying the number of jobs that each user in an overlapping community has directed to printers $p_i$ and $p_j$ (i.e., "total overlapping jobs"). Subsequently, the number of redirectable jobs for all redirection combinations are summed for each printer redirection combination (i.e., "total potentially redirectable jobs"). Finally, the redirectibility element $r_{ij}$ in redirection matrix R is obtained for each redirection by dividing the total number of jobs potentially redirectable for a printer redirection combination ij by the total number of potentially redirectable jobs for all the redirection combinations from a source printer (i.e., printer from which a print job is redirected) to any other target printer (i.e., printer to which a print job is redirected) on a network. The redirectibility elements r are in effect weight parameters that reflect community habits, where the greater the weight indicates a greater likelihood that a proximity relation exists (or how natural a redirection is) between two printers.

More formally, the method provides that the potential of redirectability from printer $p_i$ to printer $p_j$ is the total number of jobs that all the users in the community overlapping vector $C_{ij}$ have printed to printer $p_i$ and that is assumed could have been printed to printer $p_j$. In one embodiment, print logs of printers $p_i$ and $p_j$ may be used to calculate the community overlapping vector $C_{ij}$ for a pair of printers $p_i$ and $p_j$ by determining the number of jobs that each user $c_s$ in $C_{ij}$ could have printed. A vector $V_{ij}$ containing the number of jobs printed for each user $c_s$ in the community overlapping vector $C_{ij}$ can be defined as: $V_{ij}=\{v_1, v_2, \ldots v_d\}$, such that $d \leq m_i \hat{} d \leq m_j$ and the dimensions of the vector $V_{ij}$ depend on the overlapping number of users that print to printer $p_i$ and printer $p_j$ which is smaller than total number of users $m_i$ and $m_j$ that print to printer $p_i$ and printer $p_j$, respectively.

The potential total number of jobs printable from printer $p_i$ to printer $p_j$ is defined as $h_{ij}$ and may be calculated simply adding all the elements v in the vector $V_{ij}$ as follows:

$$h_{ij} = \sum_{k=1}^{k=d} v_k,$$

where d equals the total number of users in the community overlapping between printer $p_i$ and printer $p_j$, and where $h_{ij}$ equals zero where i=j since the potential of jobs printable from a printer $p_i$ to itself is zero (i.e., $\forall i\ h_{ii}=0$). In the case a printer is available, $h_{ii}$ represents the total number of print jobs printed from printer $p_i$ to printer $p_i$ which is in fact the total number of print jobs printed in $p_i$.

Further, potential jobs redirectable $h_i$ from a printer $p_i$ to all the other printers in a network is the total number of jobs that all the users in all the overlapping communities of printer $p_i$ could have printed by print redirection to any other printer in the network, which may be defined as:

$$h_i = \sum_{j=1}^{j=n} h_{ij},$$

where n is the total number of printers in a network.

The redirectibility element $r_{ij}$ is obtained by dividing the potential number of redirectable jobs from printer $p_i$ to printer $p_j$ known as $h_{ij}$ by the potential number of redirectable jobs from printer $p_i$ to all the other printers in the network defined as $h_i$:

$$r_{ij} = \frac{h_{ij}}{h_i} = \frac{h_{ij}}{\sum_{i=1}^{i=n} h_{ij}},$$

which provides that the redirection matrix R satisfies the following rules of construction:

$$\forall i, j\ r_{ij} \geq 0, \forall i \sum_{j=1}^{j=n} r_{ij} = 1, \forall i, \text{ and}$$

given the convention that $h_{ii}=0$, means that $\forall i\ r_{ii}=0$.

One advantage of such modeling of the redirection matrix R is that all information required to calculate its elements can be mined from a print job log stored, for example, on a centralized job spooler or from the reconstruction of a network print job log by means of the job log data exchange between printers operating on a network (e.g., via a defined negotiation protocol). Alternatively, the information required to calculate the elements of the redirection matrix R can be retrieved from client spooler logs (e.g., such as a user workstation). In one instance of this embodiment, agents are installed on user workstations to capture information concerning print job submissions (e.g., printer and job properties). This embodiment is particularly suitable for situations when access to a central print server does not exist or is interrupted.

A further advantage of such modeling of the redirection matrix R is that the redirection matrix R is asymmetrical. Each redirection value $r_{ij}$ that is calculated in the redirection matrix R is based in data from job logs of printers $p_i$ and $p_j$ which means that the redirection value of $r_{ji}$ is likely to be different to $r_{ij}$. Advantageously, this asymmetrical nature of the redirection matrix R permits the data of the redirection matrix candidates to be readily filtered. That is, the asymmetry of the redirection matrix permits a further filtering or finer evaluation of the redirectibility between two printers. More specifically, the redirection matrix R is asymmetrical because, for example, the parameters from which redirection value $r_{ij}$ is calculated depend only on calculations from printer $p_i$. In other words, the number potential jobs redirectable from printer $p_i$ to printer $p_j$ will probably not be the same as the number potential jobs redirectable from printer $p_j$ to printer $p_i$ since in most cases the jobs submitted to a printer $p_i$ are most likely not to be the same as those sent to printer $p_j$, which may be more generally set forth as: $\forall i,j\ h_i \neq h_j$ and $h_{ij} \neq h_{ji}$.

For example, assume all users of in a local network have access to a single color printer. Examining the users community of the color printer will likely reveal that all the users, or at least most of them, are part of the single color printer's user community since it is the only printer on the local network able to deliver color prints. A community overlapping evaluation between the color printer and any other non-color printer on the local network will likely suggest that all users of any non-color printer are also users of the color printer.

Further this example illustrates that the potential of jobs redirectable from any non-color printer to the color printer will be the complete set of jobs printed on the non-color printer which means that the redirectibility element from the non-color printer to the color printer will have the greatest potential redirection. In contrast, the potential redirection of jobs from the color printer to the corresponding non-color printer will likely not be as great. This is because the total number of potential jobs redirectable from the color printer to any other non-color printer on the local network will in most cases be higher than the total potential of jobs redirectable from the non-color printer to any other non-color printer in the network as the color printer receives jobs from the largest community of possible users (i.e., all users on in the local network).

In addition, this example illustrates one source of potential noise in a redirection matrix R may be defined as "different-functionality redirection noise". Different-functionality may include any one or more of the following printer functions: color, plex, finishing, stapling, paper size, etc. Accordingly, the redirection matrix is optionally filtered to eliminate relationships with little or no reciprocity and thereby eliminate or reduce different-functionality redirection noise.

Referring again to an example local network equipped with multiple non-color printers and one color printer. As equipped, the example local network creates a biased environment where all users who print to a non-color printer only have the option to print color documents at the single color printer. It can thus be observed that the redirectibility from each non-color printer to the color printer is extremely high since any job printed by a user to a non-color printer who may occasionally print jobs at the color printer will be considered as redirectable to the color printer in the event the non-color printer is unavailable.

In one embodiment, different-functionality redirection noise may be filtered by evaluating printers in the community with comparable functionality. For example, documents that are directed to a black and white printer are selected for redirection to a functionally comparable black and white printer. In another embodiment, such different-functionality redirection noise may be filtered using a trigger value for all redirectibility element $r_{ij}$ calculations of the redirection matrix R.

In the second embodiment, after calculating each redirectibility element $r_{ij}$ of the redirection matrix R, the redirectibility elements $r_{ij}$ and $r_{ji}$ of the printers $p_i$ and $p_j$ are compared and if $r_{ij}$ or $r_{ji}$ is equal to zero then the printers $p_i$ and $p_j$ are not considered redirection candidates of each other. For example, a trigger value with two digit precision of 0.01 in the redirection matrix R may be defined for pairs of redirectibility elements $r_{ij}$ and $r_{ji}$ (i.e., if $r_{ij}$0.01 OR $r_{ji}$<0.01 then $r_{ij}$, $r_{ji}$=0). Thus in this example, a redirection between printers $p_i$ and $p_j$ for redirectibility elements $r_{ij}$ or $r_{ji}$ that is less than a trigger value may be discarded since it will in most cases be the result of a source of a different-unctionality redirection noise (e.g., printer "HOLA" identified in FIG. 8 does not appear to have any redirections in FIG. 9).

Advantageously, this second embodiment allows sources of different-functionality redirection noise to be filtered without applying comparable functionality filtering, which permits comparable functionality filtering to be used for other purposes such as for enforcing usage policy mechanisms (e.g., no printing black and white documents on color printers). Further this embodiment permits different-functionality redirection noise be accounted for independently and at an earlier stage than certain policy enforcement mechanisms that may only be applied (or evaluated) at the time the job is requested (e.g., usage permissions, cost constraints, percentage of color forming part of a document, paper loaded in a printer, etc.).

D. Computing A Redirection Matrix

This section sets forth an embodiment for computing the redirection matrix R. Computation in this embodiment may be performed, for example, by:

(a) calculating the user community $U_i$ for each printer $p_i$;
(b) for each printer $p_i$, calculating user community $U_j$ overlappings with any other printer $p_j$ to produce community overlapping vector $C_{ij}$;
(c) for each community overlapping vector $C_{ij}$, evaluating its users printing potential in order to obtain the printing potential vector $V_{ij}$ by summing all the jobs printed by each user in user community $U_i$ to printer $p_i$;

(d) for each printer $p_i$, evaluating the potential of jobs printable from printer $p_i$ to each other printer $p_j$ in accordance with the following equation:

$$h_{ij} = \sum_{i=1}^{i=d} V_{ij} \ \forall \ i \ h_{ij} = 0,$$

where d is the total number of users in the community overlapping between printer $p_i$ and printer $p_j$;

(e) for each printer $p_i$, evaluating the potential of jobs printable from printer $p_i$ to any other printer $p_j$ in accordance with the following equation:

$$h_i = \sum_{j=1}^{j=n} h_{ij},$$

where n is the total number of printers in the network;

(f) for each printer $p_i$, evaluating the redirectibility parameter $r_{ij}$ to each other printer $p_j$:

$$r_{ij} = \frac{h_{ij}}{h_i} = \frac{h_{ij}}{\sum_{j=1}^{j=n} h_{ij}} \forall \ i \ r_{ii} = 0,$$

where n is the total number of printers in the network.

Table 1 illustrates an example embodiment of the form of data or dataset recorded for each print job in a print job log of a computer network having a plurality of printers. The print job log may be recorded at a central location or at decentralized location (e.g., at each printer or print server).

TABLE 1

Dataset: job log

| Data | Field | Type |
|---|---|---|
| User | userID | TEXT |
| Destination Printer | printer | TEXT |
| Submission Date | date | DATE |

More specifically, the information in Table 1 may be grouped together in a dataset called job log that records print job log information of all printing performed by printers throughout a defined network community. Depending on the embodiment, the dataset job log may include different levels of detail. In one embodiment, the dataset job log does not contain a full set of information that a print spooler may contain but instead a partial set of information that includes only those jobs successfully printed.

In order for a printer to evaluate on its own its print redirection possibilities (e.g., assuming a printer may itself be adapted to redirect print jobs in the event it is partially disabled, such as, not being able to print while being able to receive print jobs), it must be able to have knowledge not only of its own job log information but also of the job log information of other printers in its network neighborhood or community. Such required information includes a list of: users printing to the printer $p_i$ who also print to other printers $p_j$ in order that the user community $U_i$ and community overlapping vector $C_{ij}$ may be computed; and the number of jobs printed by each user printing to printer $p_i$ to the other printers $p_j$ to compute the printing potential vector $V_{ij}$.

In order to obtain the required printer community data, each printer $p_i$ may be adapted to either obtain the print job community data of other printers $p_j$ operating on the network from each printer individually or from a central location. Table 2 sets forth one embodiment of a possible print job community dataset of a printer $p_j$ obtained by a printer $p_i$ on the network seeking to evaluate its print redirection capabilities to printer $p_j$.

TABLE 2

Dataset: $p_j$ community

| Data | Field | Type |
| --- | --- | --- |
| User | userID | TEXT |
| Number of jobs printed | jobs | INTEGER |

Advantageously, minimizing the contents of the dataset required to compute printer redirection possibilities reduces memory requirements for printers as well as network traffic involved in transferring data between printers or a central repository. In addition, different methods for exchanging the dataset may be employed by the printers to improve the exchange efficiency such as using a round robin exchange method. In one embodiment, each printer $p_i$ offers to other printers $p_j$ on the network its $p_i$-community by extracting its $p_i$-community from its $p_i$-job log using an SQL type request that may be expressed as set forth in Table 3. Upon retrieving all $p_i$-community datasets from the rest of the printers on the network, the printer $p_i$ may determine what other printers $p_j$ on the network are redirection candidates for its users.

TABLE 3

| | |
| --- | --- |
| Request Type: | $p_i$-community data extraction |
| SELECT userID, Count(jobID) AS jobs FROM 'joblog' WHERE 'printer' = '$p_i$' GROUP BY userID | |

E. Operating Embodiments

Figure 2:
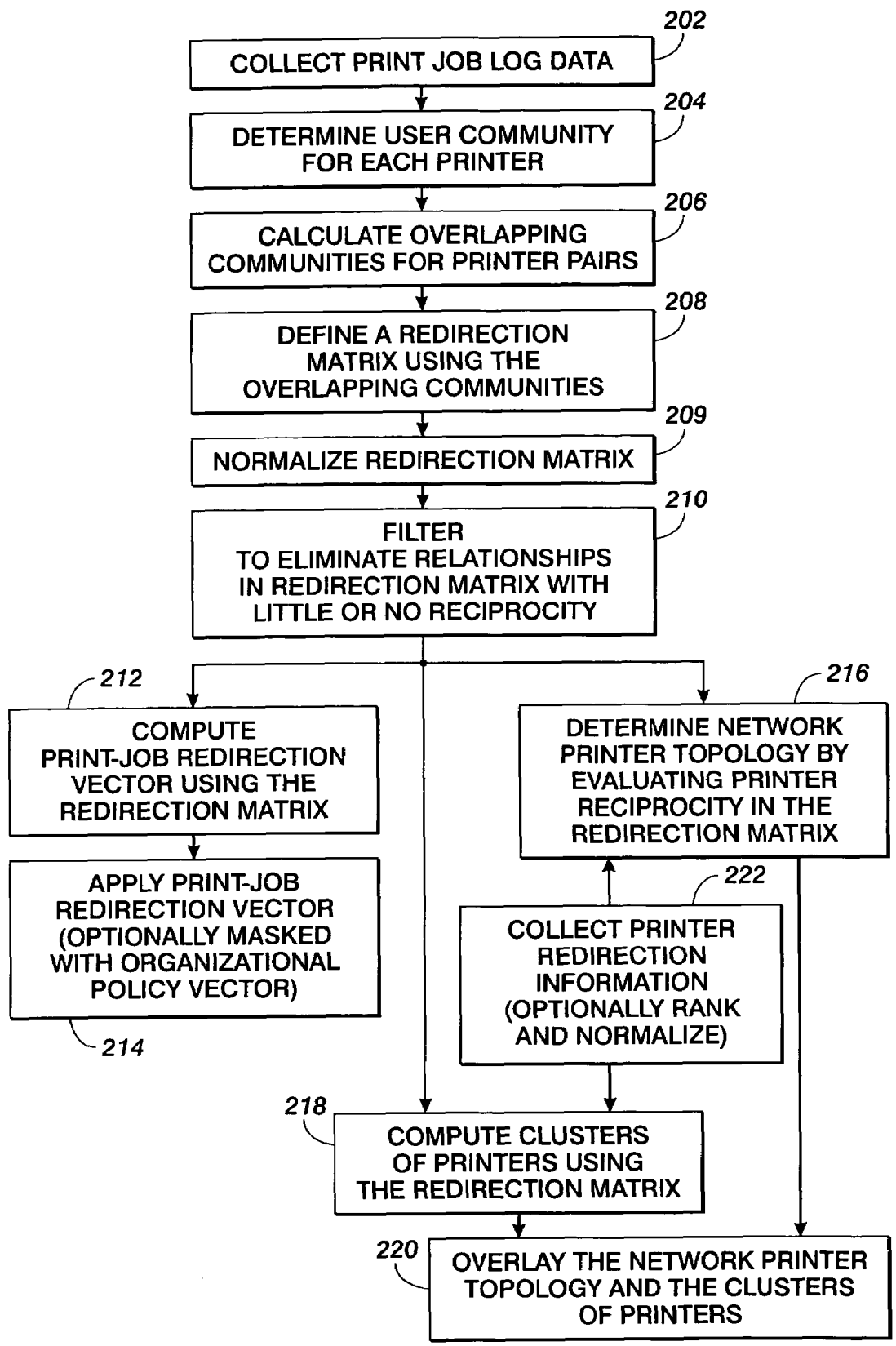
FIG. 2 sets forth a flow diagram of different operating embodiments for determining and using a redirection matrix.

FIG. 2 sets forth a flow diagram of different operating embodiments for determining and using a redirection (or organizational) matrix. One embodiment begins at 202 where job log data is collected using a dataset as, for example, defined in Table 1. At 204 using the collected job log data, user communities are determined for each printer using a dataset as, for example, defined in Table 2. At 206, overlapping communities are calculated for printer pairs. For example, FIG. 3 illustrates example printer communities for printers A at 302 and B at 304. FIG. 4 illustrates the corresponding overlapping communities $C_{AB}$ and $C_{BA}$ for the entries shown of the users 001, 006, and 008 forming part of the printer communities of printers A and B, respectively.

At 209, the redirection matrix is (optionally) normalized. At 210, the redirection matrix is (optionally) filtered to eliminate relationships with little or no reciprocity. In one embodiment, the redirection matrix is normalized such that each row of the matrix sums to one, where each row constitutes a printer redirection vector. Filtering to eliminate non-reciprocal relationships in the redirection matrix may be performed using either of the embodiments described herein. Continuing with the example shown in FIGS. 3 and 4, FIG. 5 illustrates an example redirection matrix and FIG. 6 illustrates an example filtered and normalized redirection matrix.

In one embodiment once a redirection matrix is computed at 208 or 210, a print-job redirection vector is computed at 212. The print-job redirection vector for each printer, in one embodiment, is a row of the redirection matrix computed at 208 or 210. FIG. 7 illustrates a printer redirection vector for the printer A selected from the first row of the redirection matrix shown in FIG. 6. At 214, the print-job redirection vector is applied either individually by a printer (e.g., when it is partially disabled or overloaded) or more globally by a print server (e.g., when a printer is partially disabled, overloaded, or no longer functioning). Intermittently (on a predefined or random schedule), the redirection matrix and thus individual or plural printer redirection vectors may be updated by repeating the sequence of operations beginning at 202.

When applying a print-job redirection vector at 214, the results may be optionally masked with an organizational policy vector that will enforce parameters on the class of jobs permitted at the redirected printer (e.g., following a Total Cost of Ownership (TCO) that defines the cost of ownership over a specific period of time). The class parameters may, for example, limit the following: (a) the printing of sensitive information at specified printers (i.e., security management); (b) the printing of cost ineffective jobs at specified printers (i.e., cost management, e.g., large number of pages, large copy count, large expected color toner consumption); or (c) the printing jobs at printers with functionally superior features (i.e., operational management, e.g., printing black and white print jobs at color printers).

In one alternative formulation, once a redirection matrix is computed at 208 or 210, a network printer topology is determined at 216 by evaluating printer reciprocity in the redirection matrix. The network topology produced using the redirection matrix may be adapted to provide a graphical outlay of proximate relationships between system elements operating within an organization. In one embodiment, the network topology is produced using a graphing solution called "spring embedder" as described by Eades, in "A Heuristic for Graph Drawing," Congressus Numerantium, vol. 42, pp. 149-160, 1984, which is Incorporated herein by reference. An implementation of spring embedder is available in NetDraw that operates with UCINET 6.0 (available from Analytic Technologies at analytictech.com). The spring embedder graphing method, which simulates a mechanical system with springs, may be adapted to produce a graph in which printers are positioned relative to each other depending on the attractive forces between the printers (where redirectibility element $r_{ij}$ in the redirection matrix is used to specify weights of the springs between the printers).

In another alternative formulation, once a redirection matrix is computed at 208 or 210, clusters of printers are computed at 218 by evaluating printer reciprocity in the redirection matrix. In one embodiment, rows of the redirection matrix are clustered using the procedure CONCOR (CONcurrency of iterated CORrelations, which is available in Network Analysis Software offered by Analytic Technologies). More specifically, the procedure CONCOR is used to identify ties or relationships between blocks of printers by identifying structurally equivalent elements in a matrix. Structural equivalence provides that two printers are more likely to be in the same cluster if both are connected to the same users. In other embodiments, clusters of printers are computed at 218 by evaluating "betweenness" scores as disclosed by Newman and Girvan, in "Finding And Evaluating Community Structure In Networks", Phys. Rev. E 69, 026113 (2004) and by Freeman, in "A Set Of Measures Of Centrality Based Upon Betweenness", Sociometry 40:35-41 (1977) or using a quality function or "modularity" as disclosed by Newman in "Fast Algorithm For Detecting Community Structures In Networks", Phys. Rev. E 69, 066133 (2004). In these embodiments, clusters of printers can be discovered by, for example, testing the quality of different clusters of printers, where printer redirection is represented as the underlying social network of printer users.

Optionally at 218, a cluster density matrix may be computed which provides metrics of interrelationships (or flows) between identified clusters. In one embodiment, the cluster density matrix is computed using SNA analysis that operates with UCINET 6.0 (available from Analytic Technologies). The cluster density matrix identifies the extent to which clusters (for example, arranged by machine functionality, physical location, etc.) have a tendency to redirect print jobs between clusters. The cluster density matrix may therefore be advantageously used to identify logical separations in a system infrastructure and thereby measure user satisfaction, such as, for example, user satisfaction or performance of a cluster, by determining its dependency. In one embodiment, self-sufficient clusters or independent clusters are assigned a high measure of user satisfaction (i.e., an arrangement that does not require access to other clusters to achieve desired results in the event that printer redirection is necessary).

Figure 9:
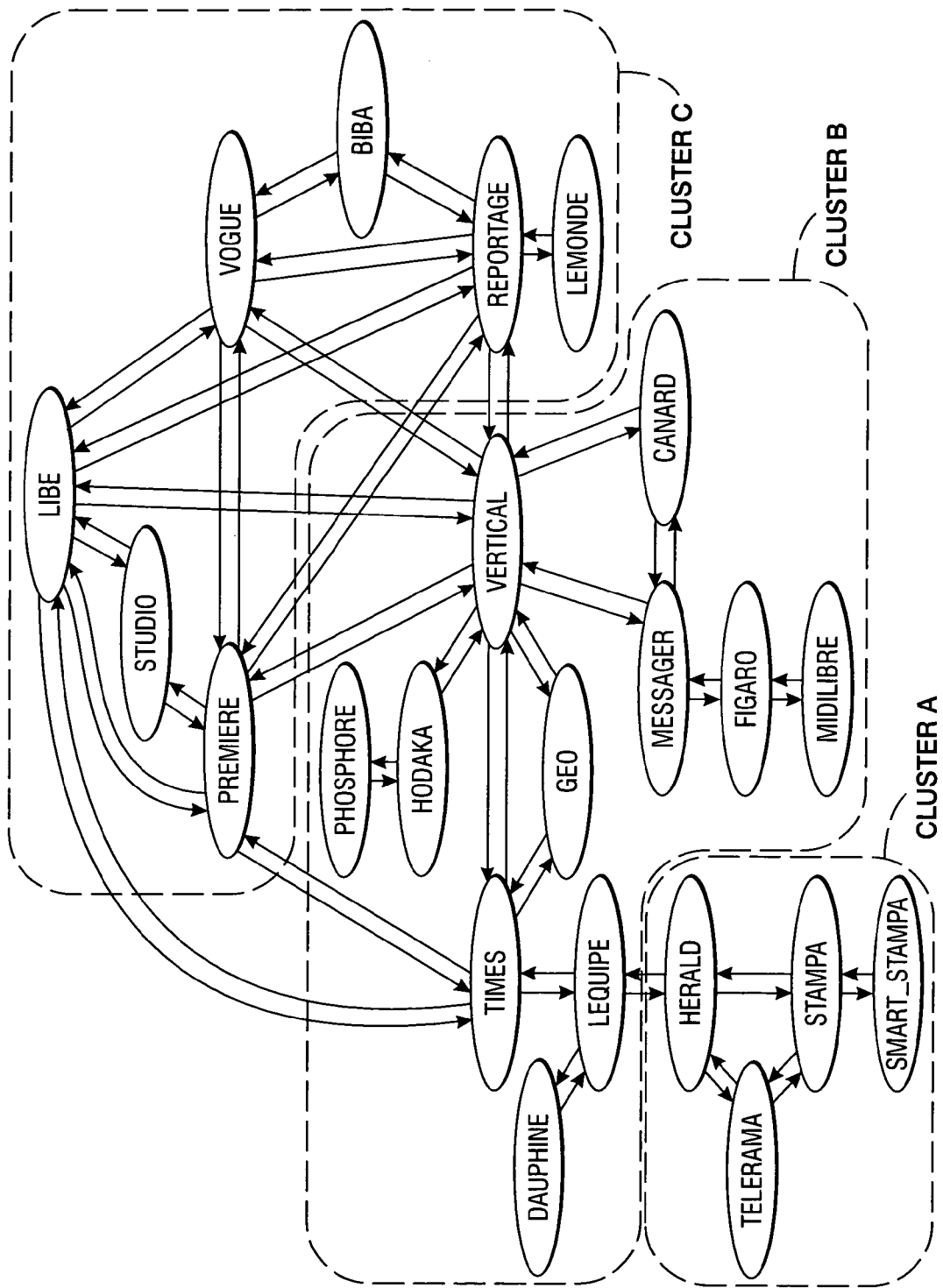
FIG. 9 illustrates an example network topology and clusters computed using a redirection matrix for the printers listed in the table shown in FIG. 8.

In yet another embodiment, the printer topology computed at 216 and the clusters of printers computed at 218 are graphically overlaid at 220. For example, FIG. 8 illustrates a table of printers available in a community composed of three physical locations (i.e., quartz, chateau, and courcarree). FIG. 9 illustrates the network topology and the clusters computed using a redirection matrix evaluated as set forth at 214 and 216, respectively, for the set of printers listed in the table shown in FIG. 8.

As shown in FIG. 9, the computed redirection matrix may be used to identify three logical clusters A, B, and C overlaid on a network printer topology, where the three logical clusters correspond to the three physical locations of the printers listed in FIG. 8 that are identified in ovals within the clusters. The topology and clusters may be used in a system for network administration, maintenance, and analysis. For example, the network topology and clusters may be used to identify the importance of printers operating on a network, for example, should a determination be made to upgrade a printer.

Figure 10:
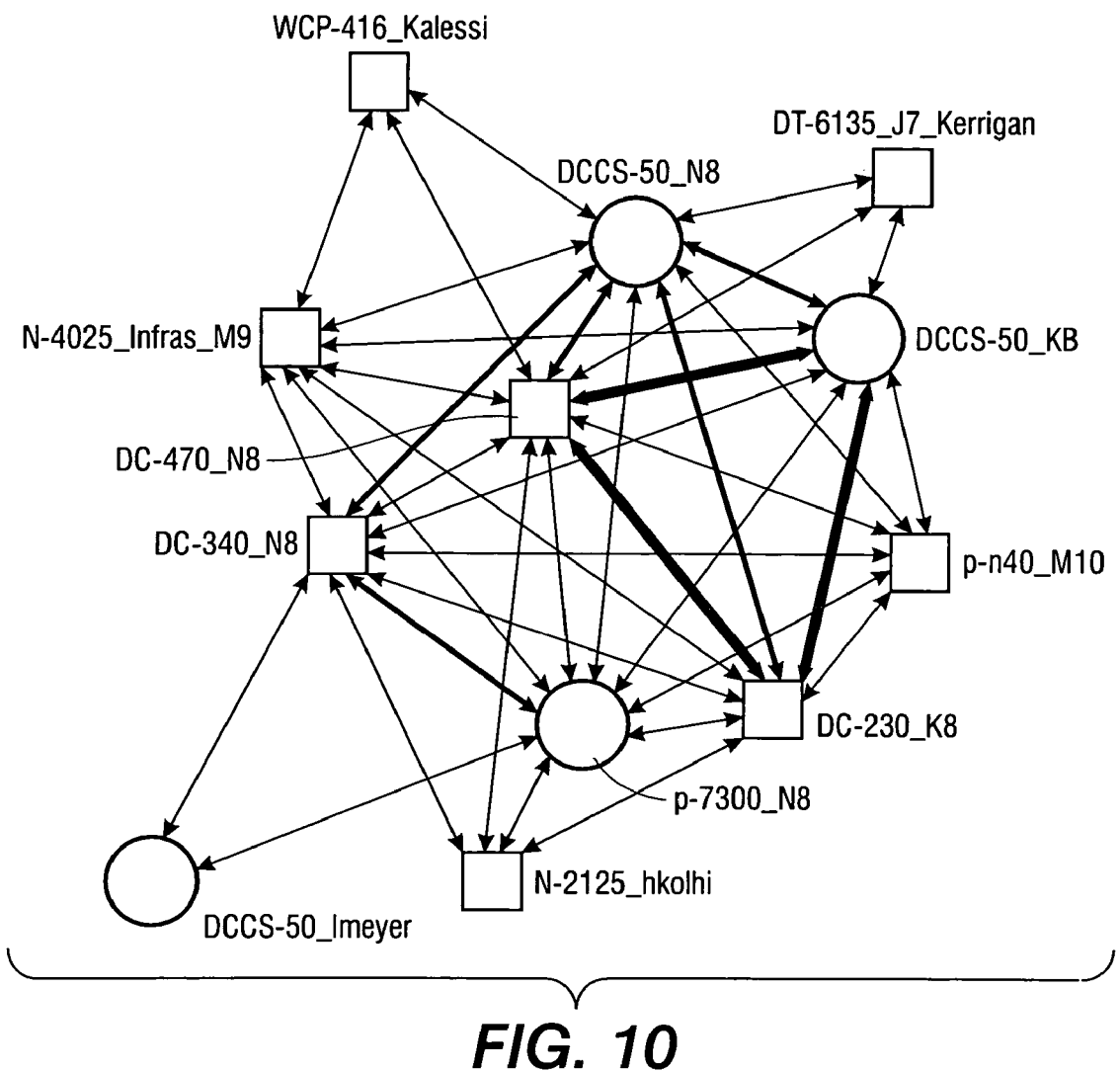
FIG. 10 illustrates an alternate representation of a network topology.

Further, the topology and clusters shown in FIG. 9 show that job log data may be advantageously used to identify physical relationships between printers operating on a network without having any a priori information concerning the organization of the network. Alternate embodiments of the graphical representation shown in FIG. 9 can use different shapes and/or colors to identify the class and/or functionality of the printer (e.g., color, black and white, etc.) and links and reciprocity between them (for example, using redirectability weights to specify line thicknesses to indicate relative reciprocal strengths). For example, FIG. 10 illustrates an alternate representation of a network topology based on a UCINET representation, where the shapes (i.e., circles and squares) represent printers of different types and where the thicknesses of the lines indicate a relative strength of the redirectabiliy strength between printers.

In a further embodiment, determining the printer network topology at 216 and the print clusters at 218 begins at 222, which involves collecting either automatically or manually specified redirection information (that is optionally ranked and normalized) to define a redirection matrix. In this embodiment, redirection information is collected by, for example, polling printers and/or print servers for user or system administrator specified redirection information.

In yet a further embodiment, the various embodiments described herein be used together or singly within a network print management system or an asset management system to facilitate the service and administration of a community of networked printers. In one embodiment, the computation of a redirection matrix, printer redirection vector, print network topology, and/or printer clusters, all or parts thereof form part of the asset and printer management systems described in U.S. Pat. Nos. 7,187,461, and 7,200,613, which are incorporated herein by reference. Such embodiments may be adapted to perform targeted capacity planning, detect a network infrastructure and its redundancies, and/or evaluate and enforce redirection decisions.

Figure 11:
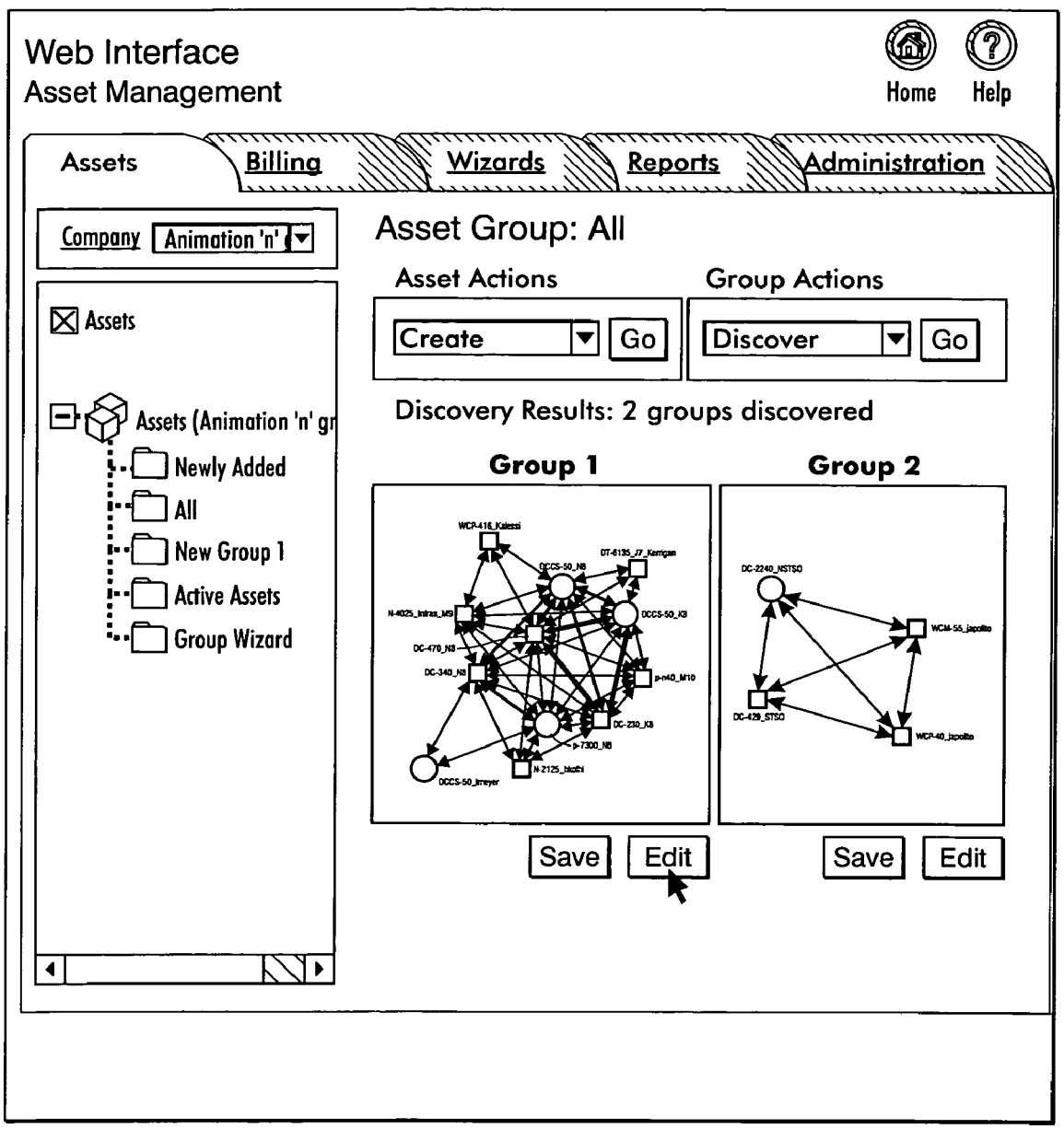
FIGS. 11-13 illustrate a series of example screens of windows as would be generated by a user interface of a computer operating an asset manager for managing overlapping communities discovered using job redirection information.
Figure 12:
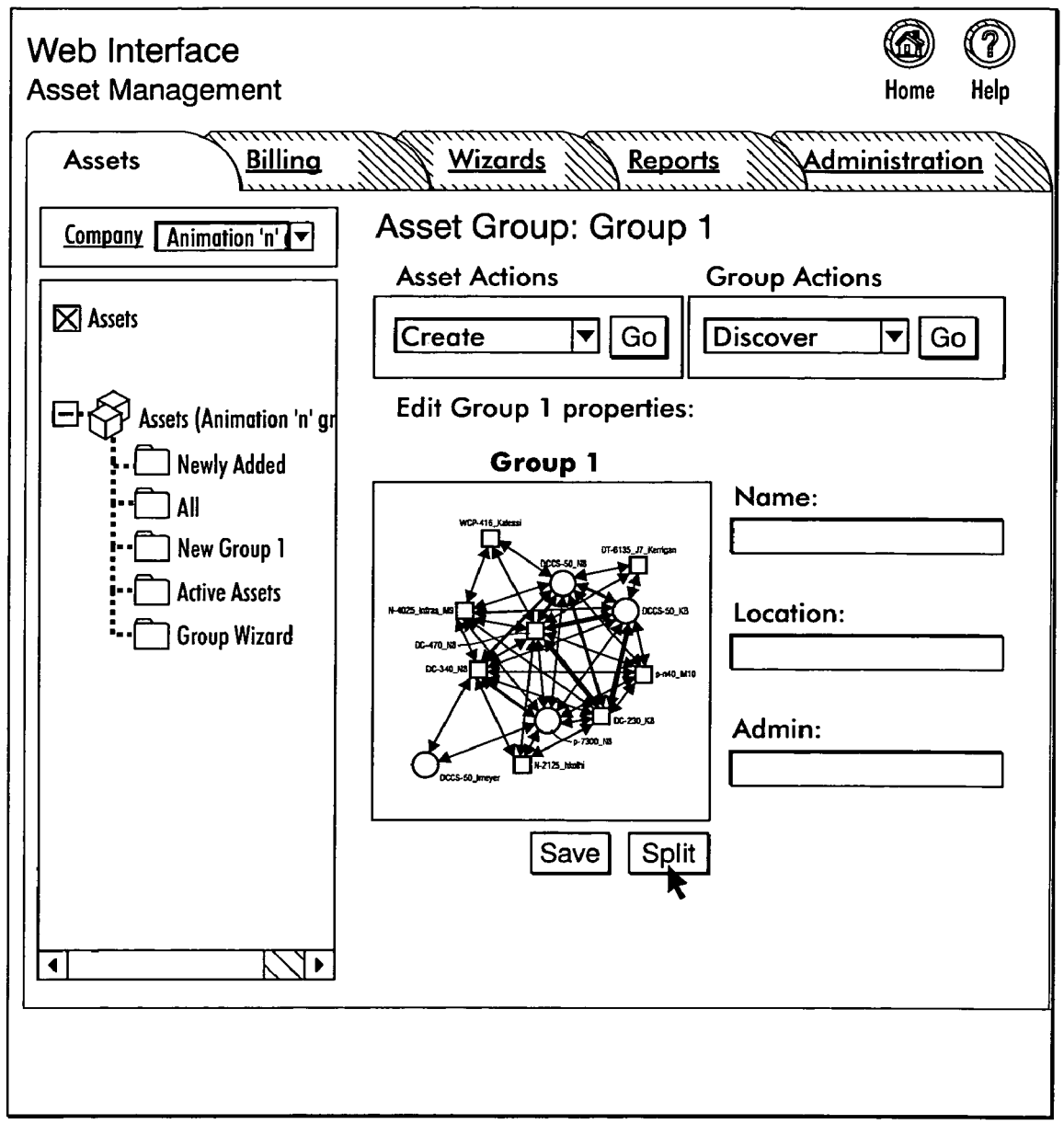
Figure 13:
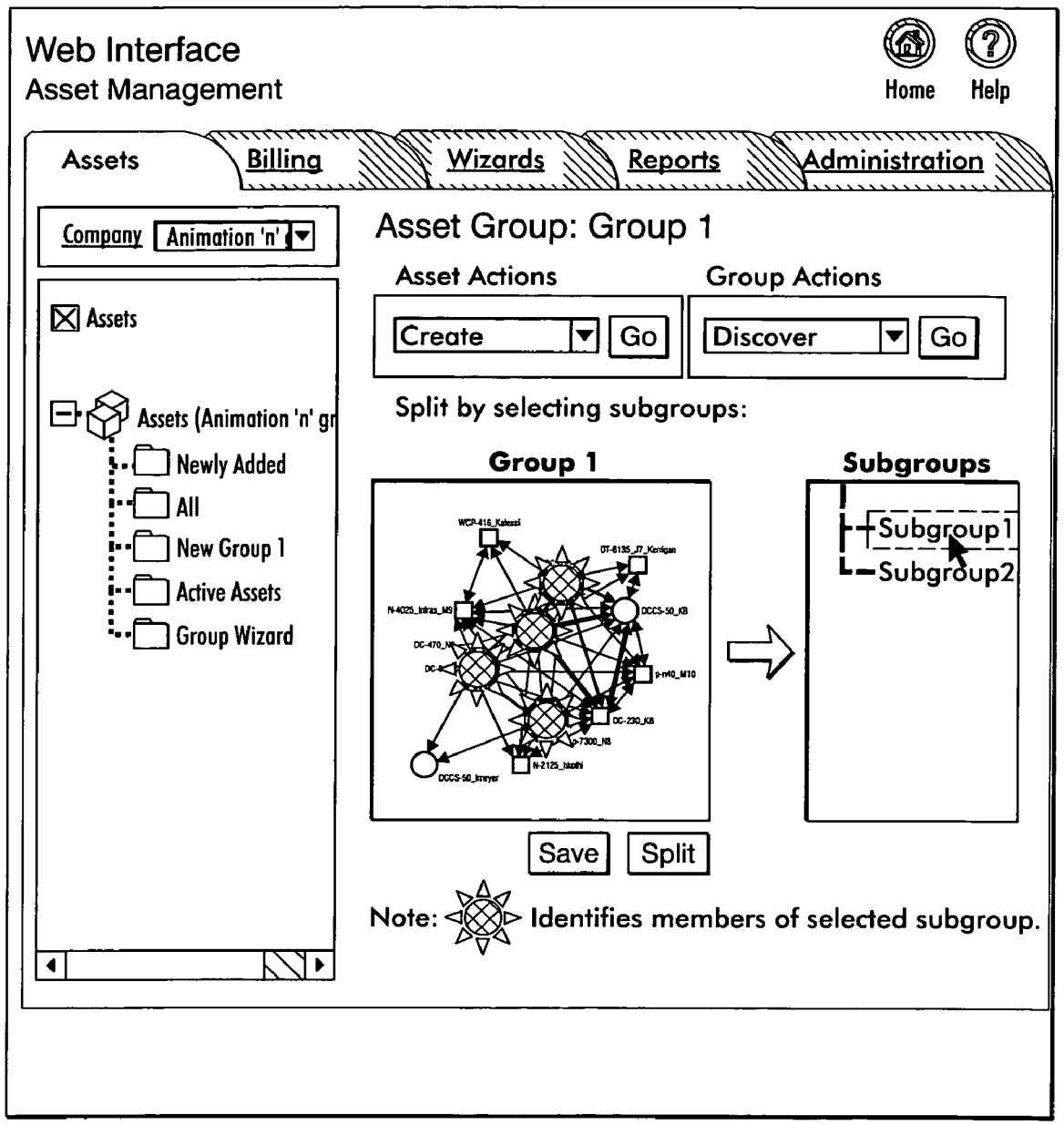

For example, FIGS. 11-13 illustrate a series of example screens of windows as would be generated by a user interface of a computer operating an asset manager for managing overlapping communities discovered using job redirection information. More specifically, FIG. 11 shows discovery results in an asset manager user interface in which two groups or clusters of printers are discovered; FIG. 12 illustrates how properties of one of the two discovered groups shown in FIG. 11 may defined; and FIG. 13 illustrates how the group shown in FIG. 11 may be split into any number of subgroups. In addition, the asset manager provides that printer redirection vectors computed for the corresponding network may be limited to operate only within defined subgroups.

In the various operating embodiment disclosed herein, printing may be performed using cryptography and digital signatures to insure the security of printed document, in the event of print job redirection. The various embodiment may therefore be used with secure non-encryption based secure release print systems, such as that described in "Printing Protocol", Xerox System Integration Standard, XNSS 118404, Apr. 1984; and "Xerox Network Systems Architecture", General Information Manual, XNSG 068504, which are incorporated herein by reference. Alternatively, the various embodiment may be used with known secure print encryption based systems as known in the art. For example, secure print release systems may be used such as that described in U.S. patent application Ser. No. 2006/0136726, which is incorporated herein by reference. Alternatively, secure print release may be maintained by using an authentication controller (e.g., LDAP/NT) to request permission for redirection from the network user before it is made automatically by the system.

Further in the various embodiments described herein, the data set evaluated for each printer job logs may include additional information besides the information set forth in Table 1. For example, the job log data set used to evaluate the redirection matrix may include information concerning the type, size, color, cost, and sensitivity of documents printed. This information and other information may be reflected graphically in network topologies and/or clusters generated using the redirection matrix, individually or together, to more fully administer and maintain shared network resources such as printers, fax machines, scanners, and multifunctional devices supporting combinations of such functionality.

In yet an additional embodiment, redirection of "print jobs" may occur either as a result of a print job submission received from a network computer and/or as a result of the following other submissions performed at a multifunction device, such as: (a) a scan and print job submission; (b) a send fax and print confirmation sheet job submission; and (c) a receive fax and print fax job submission. In this alternate embodiment, the redirection matrix may be job sensitive (i.e., different actions may be taken depending on the type of job submissions). In addition, depending on the job submission TCO may limit job redirection depending on the type of printing requested (e.g., redirection of a color document may be permitted to one printer but not another). Further in this alternate embodiment, the multifunction device may present the option of redirecting the print portion of a job submission after performing the part of the job submission not requiring any physical rendering (e.g., after scanning, receiving a fax, sending a fax, etc.).

F. Miscellaneous

Those skilled in the art will recognize that a general purpose computer (or a set thereof) may be used for implementing the different methods shown in FIG. 2. Such a general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), and the display. The network I/O may for example be coupled to a network such as the Internet. The software of the general purpose computer would include an operating system.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for managing a plurality of communicatively coupled systems, comprising:
   collecting job log data using a job log data collecting device;
   determining a user community for each of the plurality of systems using the job log data;
   calculating overlapping communities by determining common users among the user communities for each of the plurality of systems using the job log data for pairs of the plurality of systems;
   defining a redirection matrix using the overlapping communities for managing operation of the plurality of systems
   wherein at least some elements in the redirection matrix are defined by dividing total overlapping jobs between a first system and a second system by a total of potentially redirectable jobs between the first system and all other systems.

2. The method according to claim 1, wherein at least some elements in the redirection matrix define asymmetrical relationships between two systems.

3. The method according to claim 1, further comprising eliminating relationships in the redirection matrix by examining their degree of reciprocity.

4. The method according to claim 1, further comprising normalizing the redirection matrix.

5. The method according to claim 4, further comprising masking the redirection matrix with a policy vector.

6. The method according to claim 1, further comprising using the redirection matrix to identify one system of the plurality of systems to which a job may be forwarded when another system of the plurality of systems selected by a user to perform the job becomes unavailable.

7. The method according to claim 1, further comprising computing a network topology using the redirection matrix.

8. The method according to claim 7, further comprising computing clusters of systems using the redirection matrix for managing the operation of the plurality of systems.

9. The method according to claim 8, further comprising graphically representing the network topology with the clusters on a user interface.

10. The method according to claim 1, further comprising computing clusters of systems using the redirection matrix for managing the operation of the plurality of systems.

11. The method according to claim 1, wherein said collecting further comprises querying a central server communicating with the systems for their job log data.

12. The method according to claim 1, wherein said collecting further comprises one of the plurality of systems querying the other of the plurality of systems for their job log data.

13. The method according to claim 1, wherein said systems are one or more of a multifunctional device, a printer, a facsimile, and a scanner.

14. The method according to claim 1, further comprising filtering different-functionality redirection noise from the redirection matrix.

15. The method according to claim 1, further comprising using the redirection matrix to differentiate between types of job submissions to identify two or more of the plurality of systems to which a job may be forwarded when another of the plurality of systems selected by a user to perform the job becomes unavailable.

16. A method for managing a plurality of communicatively coupled systems, comprising:
- collecting job log data using a job log data collecting device;
- defining a redirection matrix using the job log data; and
- computing one or both of a network topology and clusters using the redirection matrix
- wherein at least some elements in the redirection matrix are defined by dividing total overlapping jobs between a first system and a second system by a total of potentially redirectable jobs between the first system and all other systems.

17. The method according to claim 16, further comprising graphically representing the network topology with the clusters.

18. The method according to claim 16, wherein the job log data is collected from each system operating on a network or a central repository operating on the network.

19. An apparatus for managing a plurality of communicatively coupled systems, comprising:
- a memory device for storing processing instructions for computing a redirection matrix; and
- a processor device coupled to the memory device for executing the processing instructions of the apparatus;
- the processor in executing the processing instructions:
- collecting job redirection information;
- determining a user community for each of the plurality of system using the job redirection information;
- calculating overlapping communities by determining common users among the user communities for each of the plurality of systems using the job log data for pairs of the plurality of systems;
- defining the redirection matrix using the overlapping communities for managing operation of the plurality of systems
- wherein at least some elements in the redirection matrix are defined by dividing total overlapping jobs between a first system and a second system by a total of potentially redirectable jobs between the first system and all other systems.

* * * * *